United States Patent
Chen et al.

(10) Patent No.: US 6,687,091 B1
(45) Date of Patent: Feb. 3, 2004

(54) SUSPENSION LOAD BEAM FOR DISK DRIVE ACTUATOR WITH NOTCH FOR REDUCING SPRING RATE

(75) Inventors: Y.-J. Dennis Chen, Milpitas, CA (US); Lin Guo, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/341,929

(22) Filed: Jan. 13, 2003

Related U.S. Application Data

(63) Continuation of application No. 09/587,793, filed on Jun. 6, 2000, now Pat. No. 6,532,135.

(51) Int. Cl.[7] .............................. G11B 21/16; G11B 5/48
(52) U.S. Cl. ..................................................... 360/244.8
(58) Field of Search ........................ 360/244.8, 244.2, 360/244, 240

(56) References Cited

U.S. PATENT DOCUMENTS

| | | | |
|---|---|---|---|
| 5,057,953 A | 10/1991 | Wanlass | 360/244.9 |
| 5,461,525 A | 10/1995 | Christianson et al. | 360/244.8 |
| 5,734,524 A | 3/1998 | Ruiz | 360/234 |
| 5,734,525 A | 3/1998 | Girard | 360/244.8 |
| 5,796,554 A | 8/1998 | Berding et al. | 360/244.8 |
| 5,844,752 A | 12/1998 | Bozorgi et al. | 360/244.9 |
| 5,870,252 A | 2/1999 | Hanrahan | 360/244.8 |
| 5,894,655 A | 4/1999 | Symons | 29/603.03 |
| 5,905,608 A | 5/1999 | Frees et al. | 360/265.9 |
| 6,043,956 A | 3/2000 | Hanya et al. | 360/244.9 |
| 6,141,187 A | 10/2000 | Wong et al. | 360/244.8 |
| 6,307,719 B1 | 10/2001 | Mallary | 360/244.8 |
| 2001/0008475 A1 | 7/2001 | Takagi et al. | 360/244.8 |

OTHER PUBLICATIONS

Statutory Invention Registration No. H1573, Budde, Richard H., "Reduced Mass/Inertia Suspension," published Aug. 6, 1996.
Statutory Invention Registration No. H1425, Wolter, Raymond R., "Head Suspension Assembly Having Improved Frequency Response, Accurate Head Positioning and Minimized Flying Variation," published Apr. 4, 1995.

*Primary Examiner*—Hoa T. Nguyen
*Assistant Examiner*—Julie Anne Watko
(74) *Attorney, Agent, or Firm*—Sheridan Ross P.C.

(57) ABSTRACT

A suspension load beam for an actuator assembly of a disk drive includes a bend radius portion with a spring rate that is less than 18 Newtons per meter, a first bending mode that is greater than 3,500 Hertz, and a first torsion mode that is greater than 5,300 Hertz. The method of making this suspension load beam includes cutting a sheet of material to form a flat suspension load beam including a bend radius portion, removing material in the bend radius portion from full thickness, inspecting the bend radius portion to determine its thickness, and removing material from the bend radius portion and/or from the main body of the suspension load beam to compromise the performance difference due to thickness variation in bend radius portion.

12 Claims, 4 Drawing Sheets

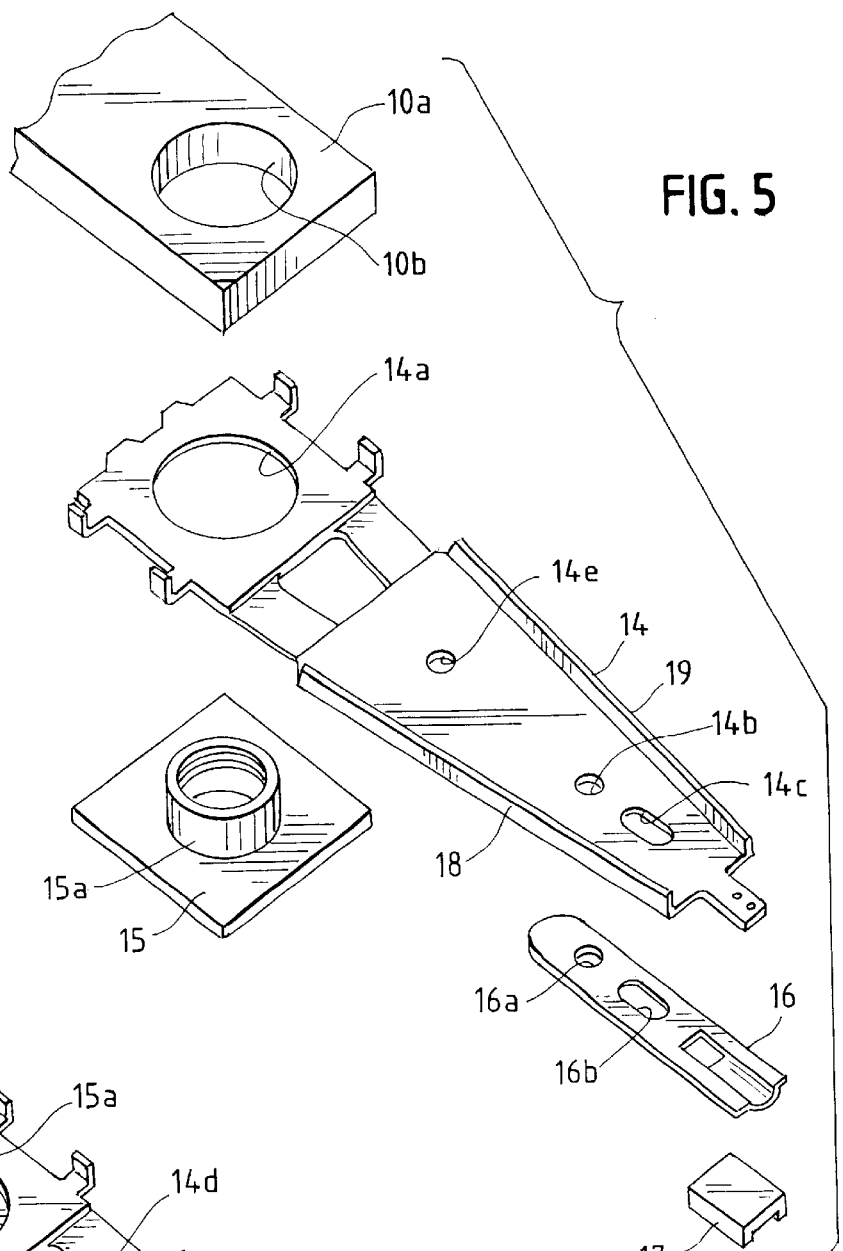
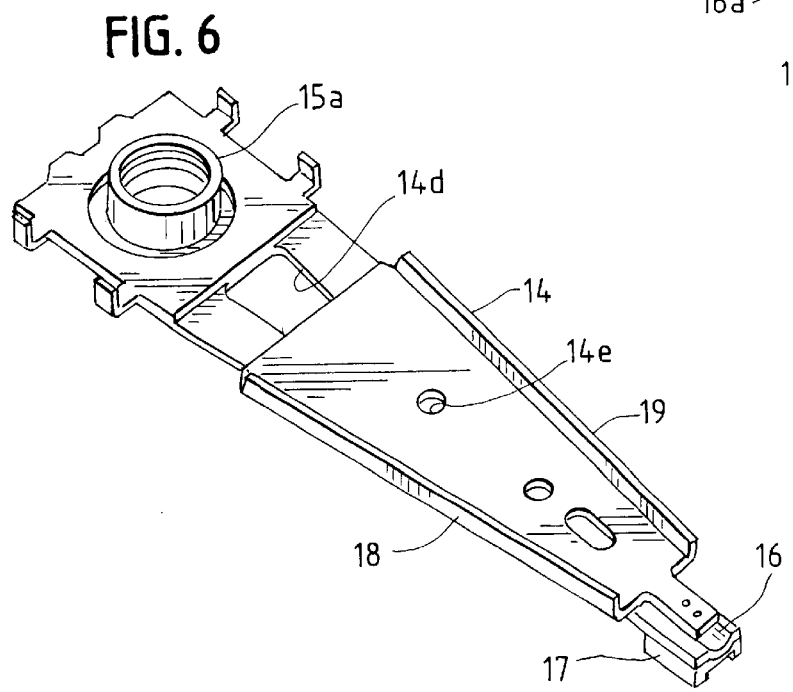

SUSPENSION LOAD BEAM FOR DISK DRIVE ACTUATOR WITH NOTCH FOR REDUCING SPRING RATE

This is a continuation of pending patent application Ser. No. 09/587,793, filed Jun. 6, 2000 (now U.S. Pat. No. 6,532,135) entitled "Suspension Load Beam for Disk Drive Actuator."

BACKGROUND OF THE INVENTION

1. Field of the Invention

The present invention relates to disk drives for information storage in computer systems, and more particularly to a suspension load beam for an actuator assembly.

2. Description of the Prior Art

Most disk drive storage systems include a plurality of disks stacked onto a rotatable spindle and a corresponding number of magnetic heads that read binary digital information from the disks and write such information on them. The magnetic heads are typically mounted on sliders that are positioned over the surfaces of the disks by rotary movement of the actuator.

A voice coil motor drives the actuator; and this motor typically includes permanent magnets mounted to the base member and a wire and bobbin coil assembly mounted on the actuator. The forces generated by the interaction between the input current of the coil assembly and the magnetic field of the permanent magnets drive the actuator to various positions over the disks.

The actuator assembly normally includes an actuator arm pivotally mounted to the base member with a pivot bearing cartridge, or other type of pivoting mechanism known in the art, a suspension load beam secured to an end portion of the arm, and a flexure secured to an end portion of the suspension load beam. The flexure supports the magnetic heads at a distal end, including read and write elements and a slider.

As performance and resonant frequency requirements have become more and more stringent, suspension load beam designs have become more and more complex, as have the methods of forming the suspension load beams. One design option used in making suspension load beams is the use of partial etching in certain areas of the suspension load beam. The process of partial etching, however, does not allow the requisite control to achieve close tolerances in the suspension load beam thickness. Variations as small as ±0.15 mil to ±0.25 mil in the thickness of the bend radius portion of a suspension load beam cause substantial variations in the spring rate, resonant frequencies, as well as other physical parameters of the beam. Substantial variation from the desired design parameters becomes a significant drawback in fabrication and results in low production yields.

The suspension load beam of the present invention and the method of producing it meets the most stringent performance and resonant frequency requirements. The method provides a solution to compensate the partial etched suspension load beams with loose tolerances in thickness, and it does so efficiently and inexpensively, maximizing the yield in production.

SUMMARY OF THE INVENTION

In accordance with one embodiment of the present invention, a suspension load beam for an actuator includes a bend radius portion with a spring rate that is less than 18 Newtons per meter, a first bending mode that is greater than 3,500 Hertz, and a first torsion mode that is greater than 5,300 Hertz. The method of making this suspension load beam includes etching a sheet of material to form the full suspension load beam profile including a partially etched bend radius portion, inspecting the bend radius portion to determine its thickness, and removing more material from the bend radius portion, and/or from the main body of the suspension load beam, to obtain close tolerances for the required performance.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 5 is an exploded perspective view of the front end of the actuator of FIG. 1, including the suspension load beam of the present invention;

FIG. 6 is a perspective view showing the front end of the actuator in an assembled form, including suspension and head slider;

Figure 1:
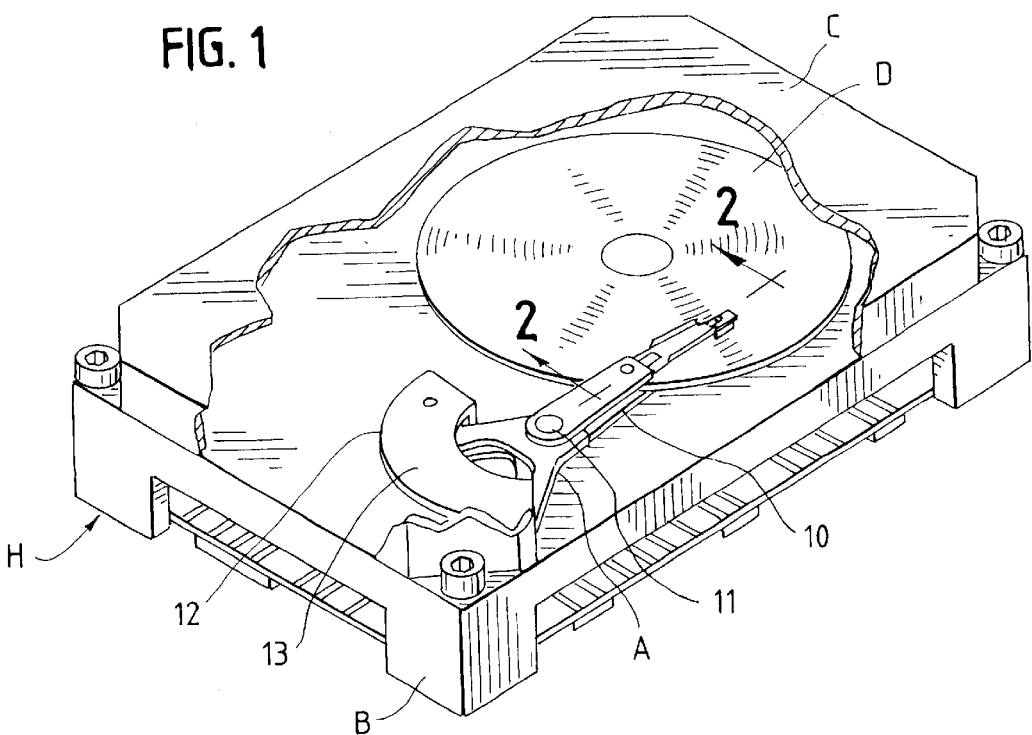
FIG. 1 is a perspective view of a hard disk drive with a portion of its casing cut away to show the actuator, including an arm, a suspension swage plate, a suspension load beam of the present invention, and a flexure, and a head slider.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may only illustrate the embodiment. In certain instances, the disclosure may not include details which are not necessary for an understanding of the present invention such as conventional details of fabrication and assembly.

DETAILED DESCRIPTION OF THE DRAWINGS

Turning now to the drawings and referring specifically to FIGS. 1–4, a hard disk drive apparatus H includes a base B, a cover C, one or more disks D, and an actuator assembly A having an arm 10 pivotally mounted to the base B with a pivot bearing cartridge (not shown) as at 11. A voice coil motor 12 drives the arm 10 about its pivot 11; and this motor includes permanent magnets 13 mounted to the base B and a voice coil mounted to the arm 10. The forces generated by the interaction between the magnetic field of the voice coil and those of the permanent magnets drive the actuator to various desired positions. For each disk D, the arm 10 includes an arm segment 10a that extends outwardly of the pivot 11.

Figure 2:
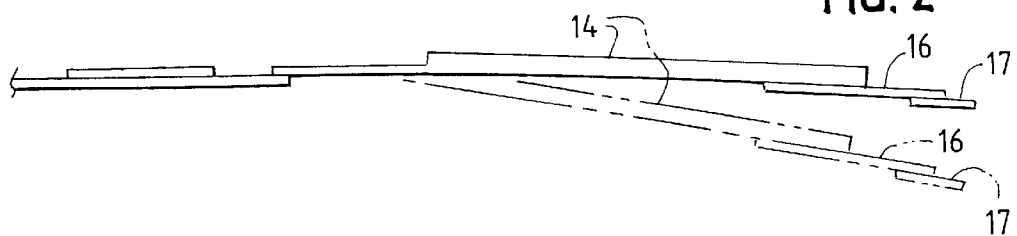
FIG. 2 is a sectional view taken along line 2—2 in FIG. 1.
Figure 3:
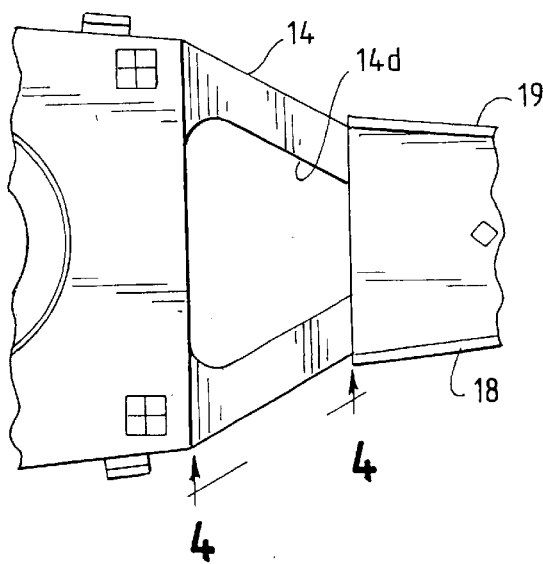
FIG. 3 is a plan view of the bend radius portion of a suspension load beam of the present invention.
Figure 4:
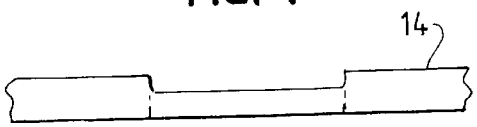
FIG. 4 is a sectional view taken along line 4—4 in FIG. 3.

A suspension load beam 14 of the present invention has a generally elongate configuration (See FIGS. 2, 5 and 6). It generally includes a secured end portion, a suspended end portion opposite the secured end portion, and a bend radius portion between the two end portions. The suspension load beam 14 lies secured (e.g., swaged) at its secured end to an end portion of the arm segment 10a, and it extends outwardly of the arm segment 10a in cantilevered fashion. A baseplate 15 with an integral sleeve portion 15a secures the suspension load beam 14 to the arm segment 10a. The sleeve portion 15a extends through an opening 14a at the secured end of the beam 14 and, in a press fit, into an opening 10b at an end portion of the arm segment 10a.

At its opposite, suspended end, the suspension load beam 14 supports a flexure member 16 which, in turn, supports a slider 17 including the magnetic heads that "read" digital information from the disk D and "write" such information on them. The flexure member 16 lies secured (as with spot welding) to the bottom face of the suspension. load beam 14 in proper alignment as defined by the openings 14b and 14c in the suspension load beam 14 and the corresponding openings 16a and 16b in the flexure member 16. (Placing the openings 14b and 14c in registry with the openings 16a and 16b, respectively, places the flexure member 17 in proper alignment with the suspension load beam 14.)

Various other features of the suspension load beam 14 help maintain the structural integrity of the beam and define physical parameters, including spring rate and various resonant frequencies (such as bending, torsion and sway). Bent edge portions on opposite sides of the suspension load beam define rails 18 and 19 that maintain the rigidity of the beam structure. An opening 14d in the bend radius portion of the beam, as well as opening 14e in the main body of the suspension load beam 14, also helps define the spring rate and resonant frequencies of the beam. It should be appreciated that the number of openings, their location and their shape can further influence the spring rate and resonant frequencies of the beam. Also, the thickness of the bend radius portion helps determine, among other parameters, the spring rate and resonant frequencies. Variations as small as ±0.15 mil to ±0.25 mil in thickness of the bend radius portion of the suspension load beam cause substantial variations in the spring rate, resonant frequencies. The suspension load beam of the present invention made with the following method of the present invention minimizes those variations.

Figure 7:
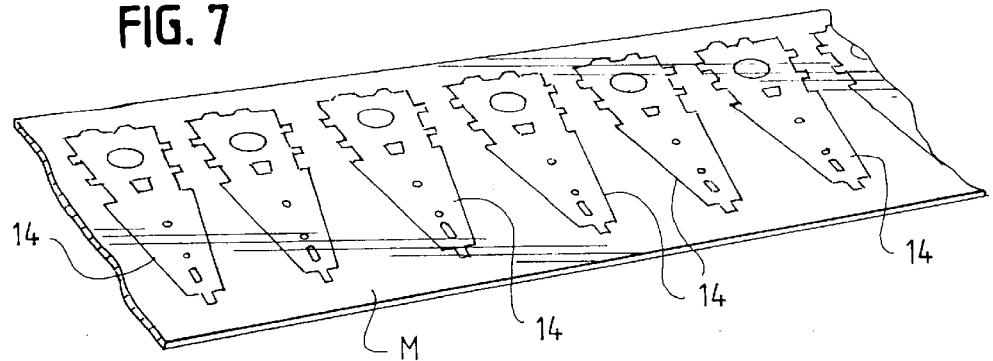
FIG. 7 is a perspective view of a sheet of material with a plurality of suspension load beams cut into the sheet.
Figure 8:
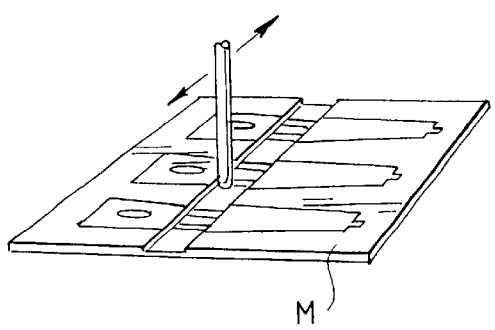
FIG. 8 is a schematic view of the inspecting step of the process of forming the suspension load beam of the present invention.
Figure 9:
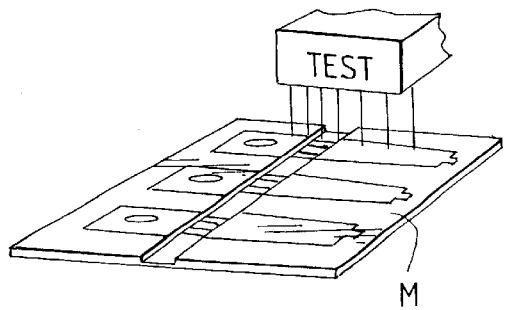
FIG. 9 is a schematic view of the material removing step of the process for optimization of bend radius profile of the present invention.

The method of making the suspension load beam 14 includes providing a flat, thin sheet of material M such as non-magnetic stainless steel. Using conventional full-depth etching techniques, conventional equipment cuts one or more suspension load beams 14 from the sheet. (This etching defines the periphery of the suspension load beam 14 and the openings, i.e., 14a–e, within the periphery. See FIG. 7.) The etching equipment also performs the following step of the method: controlled removal or controlled etching of a predetermined thickness or height of the bend radius portion of the suspension load beam 14. (See FIGS. 8 and 4.) After the controlled etching step, one or more of a variety of noncontact inspection tools (e.g., x-ray, laser, or ultrasonic equipment), inspects the bend radius portion and generates a profile matrix that identifies the areas of the bend radius portion that require further material removal (i.e., the bend radius profile modification) to compensate spring rate and major resonant frequencies within a prescribed tolerance. (See FIG. 9.) Conventional laser engraving equipment then performs this additional removal. (See FIG. 8.)

Figure 10:
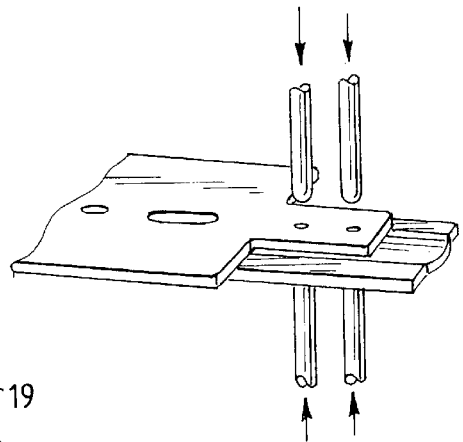
FIG. 10 is a schematic view of the step of securing a flexure to the suspension load beam, by spot welding.
Figure 11:
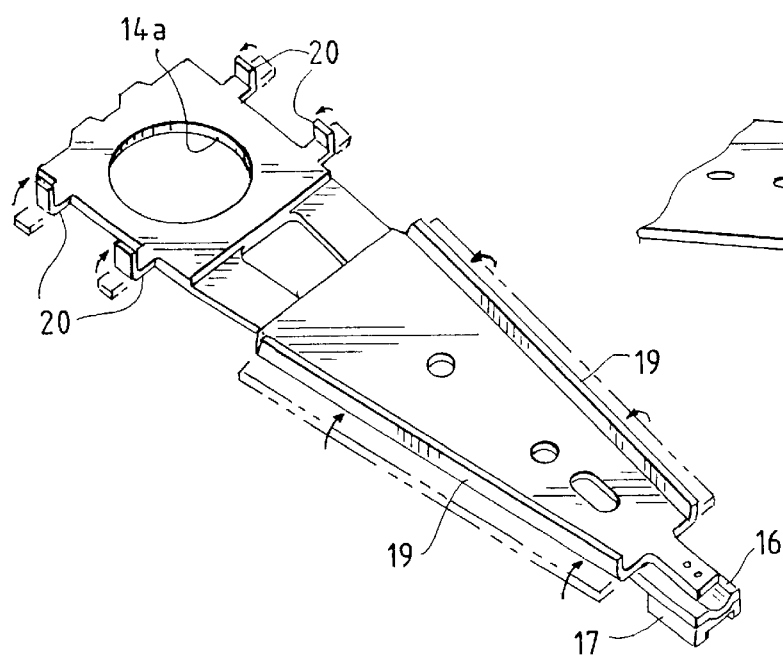
FIG. 11 is a perspective view, showing a bending step of the process of the present invention.

The next step in the manufacturing process involves securing (e.g., spot welding) the flexure member 16 to the suspension load beam. (See FIG. 10.) Finally, bending the edge portions to form the rails 18 and 19, the tabs 20 to allow easy attachment of wire connections, and the bend radius portion to introduce pre-loading onto the beam completes the fabrication of the beam. One may place the beam in position for securing it to the arm segment 10a and then secure these two components by forcing the base plate 15 in place, as described in the text above.

Using the method of the present invention, suspension load beams with the following modified bend radius portions were obtained, and they had the following parameters as determined by conventional finite element analysis techniques:

TABLE 1

Suspension Bend Radius Modification - FEA Prediction

Figure 12:
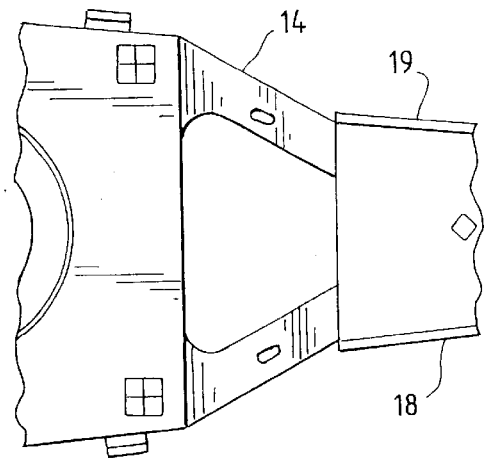
FIG. 12 is a plain view of the bend radius portion of the suspension load beam identified as Example 1 in Table 1, incorporating the present invention.
Figure 13:
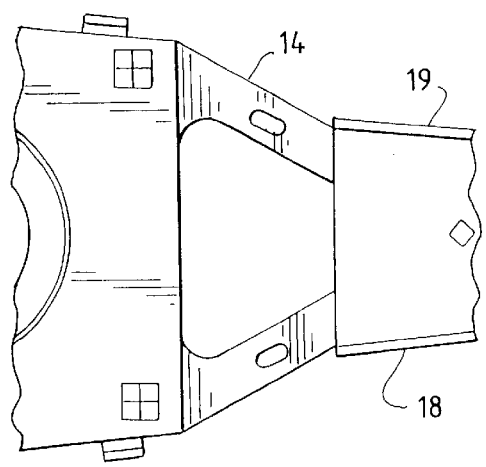
FIG. 13 is a plain view of the bend radius portion of the suspension load beam identified as Example 2 in Table 1, incorporating the present invention.
Figure 14:
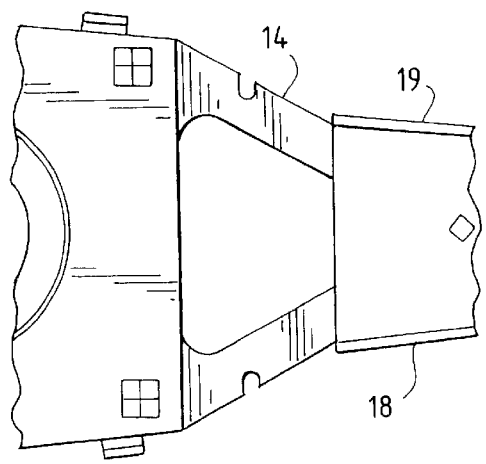
FIG. 14 is a plain view of the bend radius portion of the suspension load beam identified as Example 3 in Table 1, incorporating the present invention.
Figure 15:
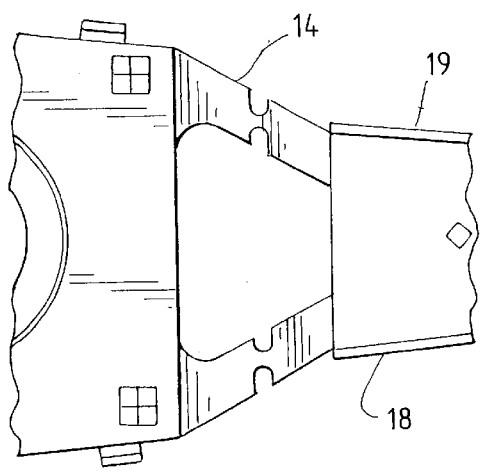
FIG. 15 is a plain view of the bend radius portion of the suspension load beam identified as Example 4 in Table 1, incorporating the present invention.

| | Kv (N/m) | B1 | T1 | B2 | T2 | Sway |
|---|---|---|---|---|---|---|
| 1.85 + 0.15 mil partial-etched bend radius | 18.84 | 3,568 | 5,439 | 7,902 | 12,816 | 11,899 |
| Nominal; t = 1.85 mil | 16.06 | 3,505 | 5,288 | 7,742 | 12,633 | 11,772 |
| 1.85–0.15 mil etched bend radius | 12.85 | 3,407 | 5,061 | 7,511 | 12,450 | 11,594 |
| Radius modification Example 1 (FIG. 12) t = 1.85 + 0.15 mil | 17.89 | 3,568 | 5,421 | 7,899 | 12,773 | 11,764 |
| Radius modification Example 2 (FIG. 13) t = 1.85 + 0.15 mil | 15.98 | 3,566 | 5,395 | 7,892 | 12,347 | 11,082 |
| Radius modification Example 3 (FIG. 14) t = 1.85 + 0.15 mil | 17.59 | 3,562 | 5,394 | 7,900 | 12,601 | 11,756 |
| Radius modification Example 4 (FIG. 15) t = 1.85 + 0.15 mil | 16.12 | 3,561 | 5,368 | 7,879 | 12,553 | 11,726 |

Examples 1–4 from the proceeding table are illustrated in FIGS. 12–15, respectfully. Each example, and associated figures, illustrate a small change in the bend radius profile or geometry. For these examples t is the thickness of the bend radius, Kv is the spring rate, B1 is the first bending mode, T1 is the first torsion mode, B2 is the second bending mode, and T2 is the second torsion mode.

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicants intend to cover any modifications and other embodiments as incorporate those features which constitute the essential features of this invention.

What is claimed is:

1. In a disk drive actuator assembly, the actuator assembly including an actuator arm pivotally mounted on a shaft and movable between a first position and a second position by a voice coil motor, and a suspension load beam affixed to the actuator arm, the improvement comprising:

the suspension load beam having a secured end portion and a suspended end portion, a bend radius portion disposed between said secured end portion and said suspended end portion, said secured end portion having a first thickness, said bend radius portion having a second thickness that is less than said first thickness and a central opening, said bend radius portion further comprising means for reducing a spring rate of said bend radius portion in addition to said second thickness that is less than said first thickness and said central opening;

wherein said means for reducing a spring rate of said bend radius portion includes at least areas of third thickness which are less than said second thickness and are disposed along a lateral edge of said bend radius portion;

wherein at least one of said areas of third thickness is an area void of material; and wherein said at least one area void of material is a notch.

2. The actuator assembly of claim 1, wherein said areas of third thickness are disposed equidistant from said secured end portion and said suspended end portion.

3. The actuator assembly of claim 1, wherein said at least one of said areas of third thickness is an aperture.

4. The actuator assembly of claim 1, wherein said means for reducing a spring rate of said bend radius portion further includes areas of a fourth thickness which are less than said second thickness and are disposed between the lateral edges of said bend radius portion and said central opening.

5. The actuator assembly of claim 4, wherein at least one of said areas of a fourth thickness disposed between the lateral edges of said bend radius portion and said central opening is an area void of material.

6. The actuator assembly of claim 5, wherein said at least one area void of material disposed between the lateral edges of said bend radius portion and said central opening is generally elliptical in shape.

7. In a disk drive actuator assembly, the actuator assembly including an actuator arm pivotally mounted on a shaft and movable between a first position and a second position by a voice coil motor, and a suspension load beam affixed to the actuator arm, the improvement comprising:

the suspension load beam having a secured end portion and a suspended end portion. a bend radius portion disposed between said secured end portion and said suspended end portion, said secured end portion having a first thickness, said bend radius portion having a second thickness that is less than said first thickness and a central opening, said bend radius portion further comprising means for reducing a spring rate of said bend radius portion in addition to said second thickness that is less than said first thickness and said central opening;

wherein said means for reducing a spring rate of said bend radius portion is areas of thickness which are less than said second thickness and are disposed adjacent said central opening;

wherein at least one of said areas of third thickness is an area void of material; and wherein at least one of said areas void of material is a notch.

8. The actuator assembly of claim 7, wherein at least one of said areas of third thickness is an aperture.

9. The actuator assembly of claim 7, wherein said areas of third thickness are disposed equidistant from said secured end portion and said suspended end portion.

10. The actuator assembly of claim 7, wherein said means for reducing a spring rate of said bend radius portion further includes areas of a fourth thickness which are less than said second thickness and are disposed between the lateral edges of said bend radius portion and said central opening.

11. The actuator assembly of claim 10, wherein at least one of said areas of fourth thickness disposed between the lateral edges of said bend radius portion and said central opening is an area void of material.

12. The actuator assembly of claim 11, wherein said at least one area void of material disposed between the lateral edges of said bend radius portion and said central opening is generally elliptical in shape.

* * * * *

UNITED STATES PATENT AND TRADEMARK OFFICE
CERTIFICATE OF CORRECTION

PATENT NO. : 6,687,091 B1
DATED : February 3, 2004
INVENTOR(S) : Chen et al.

It is certified that error appears in the above-identified patent and that said Letters Patent is hereby corrected as shown below:

Column 6,
Line 9, please delete "." and substitute therefor -- , --.

Signed and Sealed this

Thirtieth Day of March, 2004

JON W. DUDAS
*Acting Director of the United States Patent and Trademark Office*